Feb. 16, 1965 C. H. JACKSON 3,169,726
MISSILE GUIDANCE SYSTEM
Filed Oct. 3, 1955 2 Sheets-Sheet 1
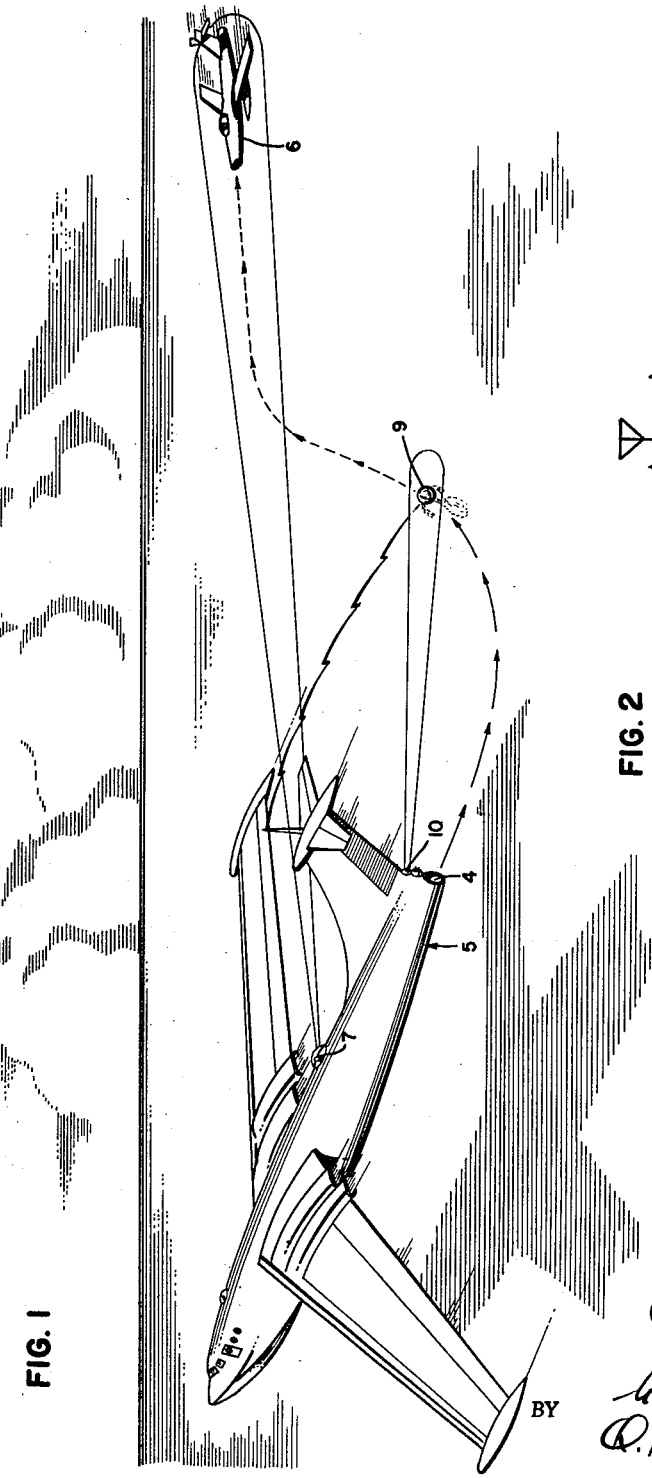
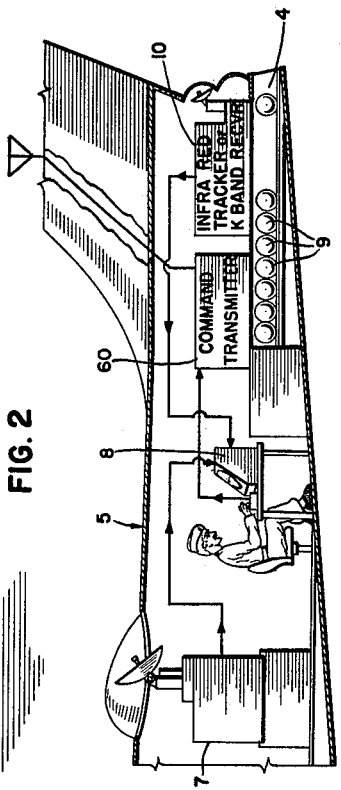
INVENTOR
CHARLES H. JACKSON
BY
ATTORNEYS

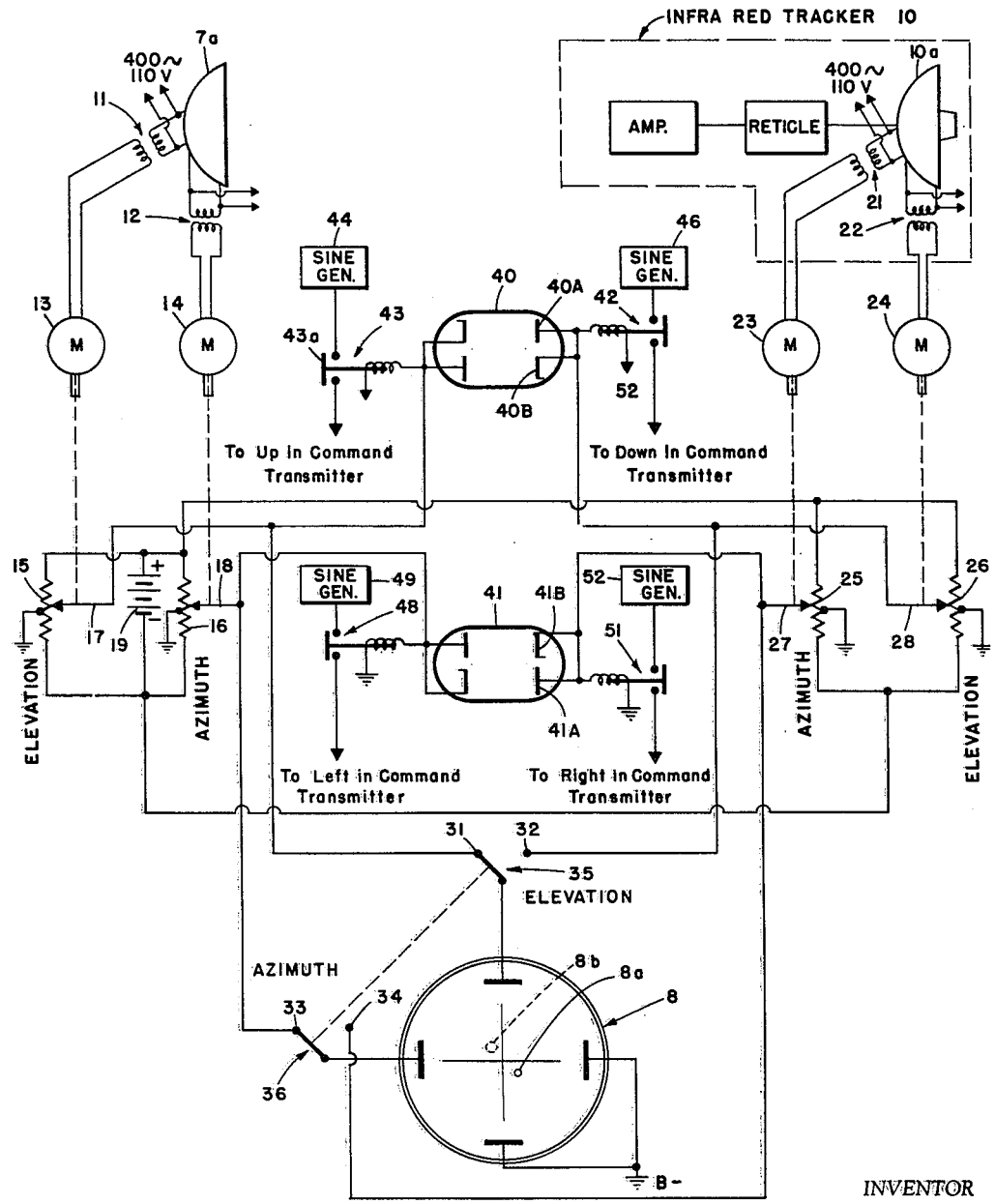

United States Patent Office 3,169,726
Patented Feb. 16, 1965

3,169,726
MISSILE GUIDANCE SYSTEM
Charles H. Jackson, 1203 Radnor Place, Falls Church, Va.
Filed Oct. 3, 1955, Ser. No. 538,292
8 Claims. (Cl. 244—14)
(Granted under Title 35, U.S. Code (1952), sec. 266)

The invention described herein may be manufactured and used by or for the Government of the United States of America for governmental purposes without the payment of any royalties thereon or therefor.

The present invention relates to a missile guidance system and more particularly relates to a method and an apparatus for guiding a missile when used as an aircraft defense weapon.

The tail defenses of certain aircraft, particularly the Martin P6M mine-laying aircraft which spends much of its tactical time very close to the ocean, for example, in the 50 to 250 feet altitudes have in the past been particularly weak. The inventive system in an attempt to overcome these difficulties provides a bomber rear hemisphere defense means comprising a guidance system capable of determining the line of sight (LOS) to a target (attacking aircraft) and the LOS to a missile such as the hereinafter identified D-40 missile and includes means for controlling the flight path of the missile after launching from a tail launcher so that its LOS coincides with the LOS to the target, thus causing collision of the missile and the target. The inventive system requires reasonable simplicity and must be of the "all weather" variety.

Since darkness and fog are encountered, a visual control system is unsuitable for some purposes of the invention. Radar and/or infrared detection sets are relied on to locate targets and control the missile flight. It should be recognized that the initial detection and tracking of targets close to the water is a very difficult task in the presence of large obscuring sea echoes. The ordinary pulse radar systems suffer very severe limitations due to their inability to separate real target echoes from the much larger ground and sea echoes. Infrared sets, which employ the near infrared spectrums, operate close to the visible spectrum so that fog and smoke will attenuate their signals, although their use is not excluded, especially in darkness. The far infrared sets, however, are capable of penetrating much further into smoke and fog, although at the present time they are not as highly developed as the nearer infrared sets.

For initial target detection C.W. radar sets have greater usefulness because target echoes can be separated from ground clutter by using target echo velocity techniques and this type of radar set is used in the inventive apparatus. The ground echoes appear as Doppler frequencies corresponding to the aircraft's own velocity, where its echoes from attacking aircraft differ by the target aircraft's velocity. These may be separated with suitable electrical filters. Accordingly, the inventive apparatus preferably utilizes such a set, as for example, the armed services' AN/APG-43 Radar which has these advantages and therefore provides superior means for determining line of sight (LOS) to the target. Appropriate infrared apparatus gives the LOS to the missile. The inventive apparatus thereupon provides for control of the flight path of the missile so that its LOS coincides with the LOS to the target thereby causing collision of missile and target in rear-hemisphere defense.

Accordingly, an object of the invention is to provide a method and apparatus for guiding a missile when used as an aircraft defense weapon.

Another object of the invention is to provide a method of guidance to be used with a guided missile weapon system when employed as a bomber rear-hemisphere defense weapon.

Another aim of the invention is to utilize infrared techniques to assist in control of a missile for air-to-air applications of a weapon system, thus approaching "all weather" operation in spite of fog, haze, smoke or darkness.

Another purpose of the invention is to provide a guidance system capable of determining the line of sight to a target and separately to a missile and providing for controlling the flight path of a missile so that its line of sight coincides with the line of sight to the target, thus causing collision of the missile and the target.

Another object of the invention is to utilize a D-40 missile to augment the tail defenses of certain aircraft, particularly the Martin P6M mine-laying aircraft, which aircraft is to spend much of its tactical time very close to the ocean, for example, in the 50 to 250 foot altitudes and which will provide a suitable control system to guide the D-40 missile from a tail launcher until it collides into the attacking aircraft, the system being reasonably simple and of the "all weather" variety.

Another purpose of the invention is to provide apparatus capable of initial detection and tracking of a target close to the water and of tracking of a missile which apparatus will exhibit properties of freedom from attenuation due to fog and smoke and wherein means are provided to cause collision between the missile and the target.

Another aim of the invention is to provide adequate defense against a normal tail cone approach maneuver of an attacking aircraft utilizing the fact that the attacking aircraft is thus in an advantageous position for the inventive aircraft defense weapon system.

Other objects and many of the attendant advantages of this invention will be readily appreciated as the same becomes better understood by reference to the following detailed description when considered in connection with the accompanying drawings wherein:

FIG. 1 is a pictorial representation of an aircraft showing a missile launcher, radar target tracking apparatus and missile tracking apparatus installed thereon, and further showing operation of the inventive system to score a hit by the tracking missile on an attacking aircraft;

FIG. 2 is a representation of a section of an aircraft showing in block units of an embodiment of the inventive system as installed in an aircraft to be defended; and FIG. 3 is a schematic representation incorporating a portion of the apparatus of FIG. 2 with the addition of means for automatic guiding of the missile to the target.

The inventive apparatus uses a missile, preferably the D-40 missile described in patent application Serial No. 409,549, filed February 10, 1954, by Randolph S. Rae, now Patent No. 3,045,596, to augment the tail defenses of certain aircraft, particularly the Martin P6M high speed seaplane mine-laying aircraft. This aircraft spends much of its tactical time very close to the ocean. A suitable control system is required to guide the missile from a tail launcher until it collides into the attacking aircraft. The inventive system provides such apparatus, is reasonably simple, and is of the "all weather" variety as required.

Referring more particularly to FIG. 1 of the drawings an aircraft 5 such as the P6M mine-laying aircraft may be attacked while on tactical maneuvers by a target 6 appearing in the tail cone attacking area behind aircraft 5. As shown in FIG. 1 a C.W. search and tracking radar 7, such as the radar known to the Navy as APG-43, may be suitably modified to fit in the rear upper fuselage of the launching aircraft 5. Radar set 7 is of the type that can locate and then track incoming targets in azimuth, elevation, range, and range rate and is capable of showing target direction as a trace in the form of a steering dot or circle 8a on an operator's scope 8 as hereinafter described. This is the direction the missile 9 is to fly into the target. An operator and crew in the aircraft decide if this target is to be fired upon. If so, the crew prepares and launches missile 9 from missile launcher 4 as the target 6 closes to a suitable range. Very little maneuvering is required by the pilot (bomber pilot) to position his aircraft on a launching course, because the attacking aircraft 6 is maneuvering into firing or attack position. This attack path is a steady course, of proper lead angle and is almost in the proper position for a tail launching. Since preference of missile launching as in the case of the D-40 missile is in the dead astern direction, a slight turn might be required to head the launching bomber 5 away from the attacker or target 6. In any case, the normal tail cone approach maneuver of the attacking aircraft 6 tends to place the attacking aircraft 6 in an advantageous position for the employment of the inventive bomber defense weapon system. Furthermore, this also permits a fast escape path for the aircraft 5. A pilot indicator (not shown) may be installed leading from the APG-43 radar 7 to indicate the proper launching path to the pilot of the aircraft 5.

After launching it is necessary to keep track of the missile 9 in flight. Several possible methods may be used and are within the scope of the inventive apparatus and method. For example, a small C.W. oscillator, preferably on the K-band could be carried in the missile 9 with a rearward facing antenna. This would require only one or two tubes. A steady signal thus radiated could be received by a highly directional radar type receiving set in the launching aircraft tail section. The latter set would be the receiving, tracking, and servo-section of a gun laying radar such as the type known to the Navy as the modified APG-32. Transmitting section, modulator, range-gate, and some of the power supplies of such a radar would not be required, as it is necessary only to receive and track a signal at an angle. This receiving combination would follow the motions of the missile flight so that its antenna would remain continually pointing at the flying missile. The direction of this path would be presented on the same operator's scope 8 as another trace represented by dot 8b, or a cross, or small circle to distinguish it from the target spot 8a.

Missile 9 would then fly a line of sight path into the target 6 similar to a beam rider. The operator in this case can manipulate the same type of joy stick control as now used on ground installations to issue up-down, right-left steering command signals that order the missile to fly a path so that the two steering dots on the scope coincide. When these dots fall upon top of each other, the aircraft 5, the missile 9 and the target 6 are all in a line. As this path is continued, missile 9 and target 6 must collide, even if the target maneuvers.

In the missile tracking method, as shown in the preferred embodiment herein, an infrared tracker 10 is used to point to the direction of the hot jet which propels missile 9. In this case the C.W. oscillator is not required in the missile as the hot combustion gases produce infrared radiation to mark the missile position. Several infrared tracking sets are available for this use. For example, the Navy's Sidewinder described in patent application Serial No. 316,819, filed October 24, 1952, by William B. McLean, now abandoned, is highly suitable for the purpose. Other types of infrared sets which are workable choices include the armed services' AN/AAS-2, AN/AAS-3, AN/DAN-3, AN/AAI-5, AN/ASQ-5, AN/ASG-4, heat seeker types A4 or A5, the Berman night sight attachment for AFCS and the Air Forces' AN/ANG-2. As contemplated in the present invention the Sidewinder combined with a fire control system is a very good choice to track the flight of the missile 9. Since the launching direction and the time of launch are both accurately known, and the missile 9 presents a large energy source at zero range, it is very easy to acquire and track such a missile with such an infrared tracking set. The infrared tracking system shows the bearing and elevation direction of the missile on the scope 8 so that the operator may command it to fly out of the line of sight path into the target at which path the steering dots coincide.

As shown in FIG. 3 automatic control is provided replacing the operator by apparatus capable of generating command steering signals. This apparatus reduces lag due to operator's time and inaccuracies due to his uncomfortable environment. At very low altitudes the radar might have difficulty in separating real targets more than about 5 degrees above the water from their images or reflections below the water. Accordingly, this difficulty is eased as shown in FIG. 1 with the radar antenna mounted on top of the fuselage and may be above the horizontal stabilizer in order to shield it from some of the water reflections and images. The K-band tracking set, or as shown, the infrared set, should not be troubled greatly by images below the water surface as these sets have a very narrow beam width and can thus resolve the target from its image on an angular basis. The APG-43 heretofore indicated as preferable for the radar set has a beam width of about 5 degrees and has been used in resolving targets in ground clutter. It should be understood that a simple launching computer device and indicators would be required for operator and/or pilot use.

Referring more particularly to FIG. 3 of the drawings the search radar unit 7 may have mounted thereon an antenna 7a which antenna follows the target 6 in azimuth and in elevation in executing its target tracking functions. The APG-43-C.W. radar has associated with its antenna a plurality of inductors from which in a conventional manner pick-off of voltage corresponding to azimuth of the target and of elevation with respect to the aircraft 5 may be determined or as shown herein a first separate inductive pick-off 12 having output voltage representing deviation of the target in azimuth and a second inductive pick-off 11 having output voltage representing deviation of the target in elevation may be incorporated. Accordingly, pick-offs 11 and 12 respectively have output voltages representing elevation and azimuth of the target respectively. The output of the pick-off representing elevation deviation of the target 11 may be fed to servo motor 13 and the output of the pick-off 12 representing azimuth deviation of the target 16 may be fed to servo motor 14. It will be understood of course that the representation shown in only by way of illustration of operation and that in actuality should the signals from the secondary of inductors 11 and 12 be too small to operate the motors 13 and 14, conventional servo amplifiers may be instituted between the pick-offs 11 and 12 which are mounted or associated with the antenna of the search radar and the motors 13 and 14 would act in accordance therewith. Motors 13 and 14 preferably will be of the type wherein an output shaft will rotate an amount corresponding to the particular position of the axis of the antenna of the search radar at a given instant. A pair of potentiometers 15 and 16 may have their slider arms 17 and 18 directly mechanically connected to the output shafts of motors 13 and 14, respectively. Potentiometers 15 and 16 may have a D.C. voltage source 19 directly across the resistance portions of these potentiometers. A voltage corresponding to instant elevational direction of the target therefore will appear at contact arm 17 of potentiometer 15 and a voltage corresponding to the instantaneous direction of the target in azimuth will appear at the slider contact arm 18 of potentiometer 16.

Associated with the infrared seeker primary reflector 10a may be mounted a pair of pick-offs 21 and 22 which pick-offs will respectively generate voltages corresponding to the instantaneous position of the primary reflector with respect to the azimuth and elevation of the missile 9 if that type of infrared seeker is used wherein the primary reflecting surface follows the missile. In other types of infrared seekers at appropriate points pick-offs may be mounted as for an example, following the reticle to insure that a voltage output will be generated by pick-offs 21 and 22 corresponding in turn to the instantaneous direction in azimuth and elevation respectively of the missile 9 with relation to the aircraft 5. It will be understood of course that in actual practice, appropriate amplifying means not shown may be instituted to follow inductive or other type of pick-offs 21 and 22 to amplify the signals in order that actuation of servo motors 23 and 24 may take place. Servo motors 23 and 24 may be of the type having an output shaft whose rotation is proportional to the signal from pick-off means 21 and 22 and which will assume an angular position corresponding to the instantaneous direction of the missile 9 with respect to the aircraft 5. Mechanically linked to servo motors 23 and 24 respectively are the slider arms 27 and 28 of respective missile azimuth potentiometer 25 and missile elevation potentiometer 26. The resistance portions of potentiometers 25 and 26 may be disposed across the same source as the resistance portions of potentiometers 15 and 16 to insure equal voltage spread over each of the four resistance portions of these potentiometers. It will be understood that conventional adjustment means may be instituted to insure equality in signal output for any given potentiometer setting of the slider arm of each of the potentiometers or of the two elevation potentiometers and the two azimuth potentiometers, respectively, to insure coinciding of positional dots or circles on an observer's scope when the target, missile and defending aircraft are aligned and to insure correct automatic command transmission as will be hereinafter explained. A conventional cathode ray tube 8 having an electron gun and deflection plates may be provided in order that voltage representing instantaneous direction of the target and voltage representing instantaneous direction of the missile may be presented to deflect the beam of electrons from the gun of the scope in such manner that two circles or dots are presented, one representing the instantaneous position of the target 6 and the other representing the instantaneous position of the missile 9. It will be understood that the scope may be of the electromagnetic or of the electrostatic type, however, for purpose of illustration an electrostatic device having a plurality of plates is shown. The slider arm 17 of the target elevation potentiometer 15 may be electrically connected to a switch contact point 31. Slider arm 28 of missile elevation potentiometer 26 may be electrically connected to a switch contact point 32. Similarly, the slider arm 18 of target azimuth potentiometer 16 may be electrically connected to a switch contact point 33 and the slider arm 27 of missile azimuth potentiometer 25 may be electrically connected to switch contact point 34. Appropriate ganged switching means 35 and 36 may provide for rapid alternate switching, the switches being disposed at contacts 31 and 33 in target position determining position and at contacts 32 and 34 in the missile position determining position. The screen of the cathode ray tube 8 may, if desired, be treated with phosphorescent or other material to present a short memory factor. The arms of switches 35 and 36 may be electrically connected to one vertical and one horizontal plate respectively of tube 8.

The other two plates of the cathode ray tube may be tied together and disposed at ground, or at fixed bias such that the dots on the cathode ray tube screen will be in central or alternatively in other desirable fixed position when the target and the missile are disposed behind and concentric with the longitudinal axis of the aircraft 5.

It will readily be seen that in the position wherein switches 35 and 36 are respectively disposed at switch contact points 31 and 33, the dot on the cathode ray tube face of the operator's scope 8 will be in a position corresponding to the range and azimuth direction of the target and that when the switches are in the second position, that is, at contact points 32 and 34 a second dot will appear on the scope face corresponding to the instantaneous direction in azimuth and elevation of the missile 9. Thus, an indication of the instantaneous position in azimuth and elevation of the target and of the missile, which may be enhanced because of the memory feature, will appear simultaneously to the observer observing the operator's scope 8 and the respective differences in azimuth and elevation between the two are thereby indicated. In nonautomatic operation it will be apparent therefore that an operator may manipulate command transmitter 60 to direct the missile to a course which will make the two dots coincide indicating that the missile is aligned with the target.

Automatic alignment of the LOS of the missile 9 and the target 6 to insure a direct hit may be provided by means of a first twin uniflow electronic device 40 and a second twin uniflow electronic device 41. The cathode of a first half 40A of twin diode 40 may be electrically connected to the slider arm 17 of target elevation potentiometer 15 and the cathode of the second half 40B of twin diode 40 may be electrically connected to the slider arm 28 of the missile elevation potentiometer 26. Relays 42 and 43 may be connected in the plate circuits of respective diodes 40A and 40B. The cathode of diode 40A may be electrically connected to the plate of diode 40B and the cathode of diode 40B may be electrically connected to the plate of diode 40A. Operation for insuring that the angle of missile elevation will be corresponded with the angle of target elevation will then occur as follows: If the target 6 is at a greater positive angle of elevation with respect to the aircraft 5 than the missile 9 a more positive voltage will appear at the slider arm 17 of elevation potentiometer 15 than at the slider arm 28 of elevation potentiometer 26 inasmuch as the slider arm will be disposed at a point nearer the positive end of the resistance portion of potentiometer 15 than the slider arm 28 will be in regard to the resistance portion of elevation potentiometer 26. The plate of diode 40B will then be positive with respect to its cathode inasmuch as the voltage representing elevation of the target is larger than the voltage representing elevation of the missile since both are taken with respect to the same positive and negative reference voltage and therefore electron current will flow from the cathode of diode 40B to its plate and thence through plate relay 43 causing its contact 43A to close and a signal will be emitted from wave generator 44 which may be a sine wave generator and impressed upon the up channel of the command transmitter. The command transmitter will then be actuated to signal the control system of missile 9 wherein will be incorporated responsive apparatus to the command transmitter to effectuate movement of the controls of the missile to cause the missile to become displaced in an up elevational direction. This will continue to occur until the missile assumes an angular elevation direction corresponding to the target angular elevation direction. Current will not flow in the opposite direction through diode 40A since its cathode is positive with respect to its plate. Should the angular elevation of the missile be larger with respect to the target the reverse will take place, that is, the voltage at the slider arm 28 of elevation potentiometer 26 and hence the voltage at the plate of diode 40A will be more positive with respect to the voltage at the slider arm 17 of elevation potentiometer 15 and therefore the cathode of diode 40A and hence current will flow through diode 40A and will not flow through diode 40B. In that event the relay 42 in the plate circuit of diode 40A will become energized closing its contacts and permitting continuously operating wave generator 46 which may be a sine wave generator to actuate the down channel of the command transmitter 60 (see FIG. 2). A transmitter of the type known to the Navy as the AN/ARW-55 may be used as the command transmitter 60 and may utilize a KY51/ARW audio coder as the transmitter coder. In the missile 9 kill be installed an AN/ARW-59 receiver which in turn will utilize a KY55/ARW audio decoder to take out the frequency corresponding to the signal and permit relay control to be used on the valves of the missile when a D-40 missile is utilized with the inventive system.

It will readily be observed that the circuit of twin diode 41 operates in the same manner for azimuth. The potentiometer slider arm 18 of target azimuth potentiometer 16 may be electrically connected to the cathode of diode 41A and to the plate of diode 41B of twin diode 41. Similarly, the slider arm 27 of missile azimuth potentiometer 25 may be electrically connected to the cathode of diode 41B and to the anode of diode 41A. Should the angle of the target 6 with respect to the aircraft 5 in left direction be greater than the angle between the missile 9 and the aircraft 5 in left direction inasmuch as the resistance portions of potentiometers 25 and 16 are disposed between identical voltages and all azimuth and elevation potentiometers are preferably linear potentiometers of appropriate corresponding resistance values for azimuth and for elevation, a greater voltage will be present at the plate of diode 41B than at the cathode of that diode. For example, assume that the target in position is disposed to the left as viewed from the aircraft 5 a greater angle than the missile is disposed toward the left as viewed from the aircraft. In that case a larger voltage will appear at slider arm 18 and hence at the plate of diode 41B than will appear at the slider arm 27 of target azimuth potentiometer 25 and hence at the cathode of diode 41B. Therefore, current will flow through relay 48 causing that relay to become energized and its contacts to be closed thereby permitting sine wave generator 49 to actuate the left channel in the command transmitter 60 to provide signals to effect displacement of the missile 9 to the left until it becomes aligned with the target in azimuth direction. Now assume that the missile 9 is further angularly displaced to the left with relation to the aircraft 5 than the target 6. In that case the voltage appearing at slider arm 27 of missile azimuth potentiometer 25 will be greater in a positive direction than the voltage at slider arm 18 of target azimuth potentiometer 16. In such case current will not flow through the diode from the plate of diode 41B to its anode but current will flow from the cathode of diode 41A to its plate and hence through the plate relay 51 closing its contacts and permitting sine wave generator 52 to actuate the right command transmitter to cause the right command transmitter channel to become energized thereby causing the missile to deviate to the right until the potentiometer arms are in balance and the missile is aligned with the target 6. In such manner the aircraft, the missile and the target will become automatically in alignment and a hit is inevitable despite maneuvering or possible aerobatics of the target within the limits of capability of the missile and its system to effect operation.

It should be understood that should an A.C. signal be desirable to operate relays 42, 43, 48 and 51 appropriate conventional D.C. amplification and conversion to A.C., or conversion to A.C. and amplification, may be installed in a conventional manner between the contact slider arms of the potentiometers and the respective plates and cathodes of the diodes. It should further be understood that switching means 35 and 36 in practice, may be replaced by electronic switching means, as for example, by a gating circuit or by a ring thyratron type of circuit.

The inventive device described above thereby outlines a method and an apparatus for guidance to be used with a missile such as a D-40 weapon missile when employed as a bomber rear hemisphere defense weapon. It suggests using C.W. radar for target search and tracking and infrared techniques to assist in the control of the missile for air-to-air applications of this weapon system, thus approaching all weather operation in spite of fog, haze, smoke or darkness and thereby outlining a method for determining the LOS to a target and the LOS to a missile and providing for controlling the flight path of the missile so that its LOS coincides with the LOS to the target to cause collision of the missile and the target. It should further be noted that applications other than air-to-air applications are contemplated utilizing the inventive apparatus and method and are within the scope of the invention. For example, it is noted that many infrared sets are small and can be made portable for ground use and that these infrared sets especially operating on the intermediate and far infrared spectrums penetrate smoke, fog and haze much better than visible light. They can be used therefore to assist present ground launching techniques by tracking the flight of the missile and of the target in the manner suggested in this application for aircraft use. This use should eliminate or greatly reduce the present smoke problem because the operator can now see where the missile is going. Many targets such as tanks, locomotives, hot buildings and shipping which cannot be seen visually but are good infrared radiators would thereby become feasible and practical targets. Either image forming or tracking sets can be used. An image forming set such as a snooper scope or sniper scope can be mounted near the launcher so that the operator can either look through the snooper or sniper scope, telescope or his present binoculars. These image-forming telescope systems present a television type picture of the terrain showing hot and cold objects on the landscape. The operator in this case could center a pair of cross hairs on the target manually to mark it. As the missile was launched into the field of view its hot jet if a D-40 was used would produce a bright image which he could steer onto the marked location with the present joy stick control. The target should be located by cross hairs because the image of the hot D-40 jet would otherwise obscure it from view. By infrared technique, the weapon's usefulness could thus be extended to operation in darkness. If a cold non-radiating target such as a pill box or gun emplacement were to be attacked, it could be illuminated by an infrared searchlight so that it could be seen on an infrared telescope.

Still another alternate modification of the inventive method and apparatus for ground use would use an infrared tracking set such as the Sidewinder tracking set on a servo mount where it could measure the target direction. The target's initial direction would be manually marked by cross hairs located on an operator's scope. As the D-40 type missile was launched, the Sidewinder could be rotated on its mount to track the missile path and present this direction as a steering dot on the operator's scope. The same joy stick command control could still be used so that the operator could steer this dot into the cross hair location and thus command the missile to flow the LOS path into the target. Here also, the operator could well be replaced by automatic control such as is shown in FIG. 3. Advantages of this method of attack are that personnel can be located safely behind solid fortifications so that a target such as a tank or pill box which might resent the missile's approach and shoot back at it would not also be aimed directly at the control station and thus prevention of hitting "two birds with one shot" would be eliminated.

It should also be noted that in a tactical weapon of the inventive type, maneuver of the aircraft causing change in relative position between missile and aircraft can be computed for by a gyroscope in the aircraft which will send a signal on change of attitude of the aircraft which signal can be recorded in a resolver and applied to the command transmitter to modify the command signals in accordance with relative changes of aircraft and missile after launching of the missile.

An important aspect of the invention is that a missile of aerodynamic stability is utilized (of approximate spherical configuration in the preferred embodiment). The conventional cigar-shaped missile, if utilized, would tend to skew off when launched due to the forward motion of the aircraft which is necessarily imparted to the missile and on presentation of an irregular front to air resistance unequal forces would cause initial erratic behavior which might turn the missile off intercept course to an extent preventing recovery at all or at least in time to provide a collision or approach sufficient to cause proximity explosion to "kill" the target.

Obviously many modifications and variations of the present invention are possible in the light of the above teachings. It is therefore to be understood that within the scope of the appended claims the invention may be practiced otherwise than as specifically described.

What is claimed is:

1. An aircraft defense weapon system for guiding a hot jet emitting missile to a target comprising a hot jet emitting, aerodynamically stable, guided missile having approximately spherical configuration, a missile launcher disposed at the rear of the aircraft, a continuous wave radar set capable of distinguishing target echoes from ground clutter, said radar being disposed in the rear upper fuselage of the aircraft, a radar scope, means responsive to information from said radar to produce an indication on said radar scope representing instantaneous elevational and azimuth direction of said target, an infrared tracker to continuously point to the instantaneous direction of the missile from the aircraft, means responsive to information from said infrared tracker to produce an indication on said scope of the instantaneous direction of the missile, and means to effect aligning of the path of the missile with the path of the target so that a target approaching toward the tail cone defense area of the aircraft may be hit and destroyed by said missile.

2. Apparatus for providing tail defense of an aircraft from a target in an aircraft tactical maneuver at a very low altitude level, comprising a hot jet emitting, aerodynamically stable, guided missile having approximately spherical configuration, a launcher to launch said missile at the target approaching the tail cone area behind the aircraft, continuous wave search and tracking radar apparatus disposed in the upper fuselage section of the aircraft, said radar apparatus locating and tracking incoming targets in azimuth, elevation, range, and range rate, an operator's scope, means to show instantaneous target position with respect to the aircraft as a dot on said scope, means for tracking the missile in flight, means for presenting the instantaneous missile position with respect to the aircraft on the operator's scope, thereby presenting indication to determine the direction the missile is to fly into the target, and means to control the missile to cause missile course deviation so that the line of sight of the missile and the line of sight of the target with respect to the aircraft may be coincided, thereby permitting the missile to strike the target.

3. In an aircraft missile guidance system for tail defense of the aircraft wherein the aircraft has launched a hot jet emitting missile at a target; a continuous wave radar set mounted on the upper fuselage of the aircraft for determing the line of sight to the target, an antenna associated with said radar having its axis aligned with the line of sight to the target, first pick-off means mounted on the antenna to sense and generate signals corresponding to angles of elevation of the line of sight to the target, second pick-off means mounted on the radar antenna to sense and generate signals corresponding to angles of azimuth of the line of sight to the target, first and second servo motors respectively driven by said signals representing elevation and azimuth angles of line of sight to the target, a target elevation potentiometer, a target azimuth potentiometer, the slider arm of said target elevation potentiometer being mechanically linked to the output of said first servo motor, the slider arm of said target azimuth potentiometer being mechanically linked to the output of said second servo motor, missile tracking means operating on the far infrared spectrum, said missile tracking means including an infrared energy receiving surface having its axis continuously pointed in operation along the line of sight to the missile, third and fourth pick-off means associated with said surface to respectively generate signals corresponding to azimuth and to elevation angle of the missile with respect to the aircraft, missile azimuth and elevation servo motors respectively driven by said third and fourth pick-offs, missile azimuth and elevation potentiometers, the slider arms of said missile azimuth and said missile elevation potentiometers being mechanically connected to the output of said third and fourth motors, respectively, to thereby place a signal upon the missile potentiometer arms corresponding to the angular directions of the line of sight in azimuth and elevation to the missile, a voltage source, said target elevation, target azimuth, missile azimuth and missile elevation potentiometers being disposed across the voltage source, each potentiometer being of similar characteristics, thereby effecting voltages at the slider arms corresponding to respective azimuth and elevation positions of the target and of the missile, and means to effect visual display of said target and of said missile line of sight angular positions whereby the line of sight to the missile may be caused to deviate from present position to a position on the line of sight to the target.

4. Apparatus for defense against an attacking target comprising an aerodynamically stable, spherically shaped, guided missile, means to launch said guided missile at the attacking target, means to determine the line of sight to the target, means to determine the line of sight to the missile, means to cause the missile to effect deviations in path to align the line of sight to the missile with the line of sight to the target, said target line of sight determining means comprising a radar device having an antenna with an axis aligned with the line of sight to the target, said missile line of sight determining means comprising an infrared tracker including an infrared receiving device having its axis in a direction corresponding to the line of sight to the missile, pick-off means associated with said radar antenna and with said infrared device to generate signals representing instantaneous line of sight to the target and to the missile, means responsive to said pick-off signals to pictorially represent the instantaneous direction in azimuth and elevation of the target and of the missile, and means responsive to said generated signals to actuate said means to cause deviation of the missile path to cause the line of sight to the missile to be aligned with the line of sight to the target.

5. Apparatus for providing rear hemisphere defense of a mine-laying aircraft which spends much of its tactical time at very low altitudes comprising a guidance system capable of determining the line of sight to a target and the line of sight to a missile, missile launching means, command transmitter means including up, down, left and right channels for controlling the flight path of the missile so that its line of sight coincides with the line of sight to the target thereby causing collision of the missile and target; said guidance system comprising a command transmitter having up, down, left and right channels, a continuous wave radar set for detecting and tracking a target, said radar set having an antenna movable with respect to the change in angle of the line of sight to the target, pick-off means associated with said antenna, said pick-off means comprising a first inductive pick-off to generate signals indicating elevational angle of the target and a second pick-off means to generate signals indicating azimuth angle of the target, a target elevation servo motor having an output shaft rotatable through an angle corresponding to the angle of elevation of the target, a target azimuth servo motor having an output shaft rotatable through an angle corresponding to the azimuth angle of the target, the motors being driven by the generated signals, a target elevation potentiometer and a target azimuth potentiometer, a slider arm associated with said elevation potentiometer mechanically linked to the output shaft of said elevation servo motor, a slider arm associated with said azimuth potentiometer mechanically linked to said azimuth servo motor output shaft, an infrared tracking device to track the missile in flight, infrared target position receiving means, an azimuth and an elevational inductive pick-off associated with said infrared signal receiving device and generating signals in accordance with the angle of the line of sight to the missile, a missile azimuth servo motor driven by said missile azimuth pick-off, a missile elevation servo motor driven by said missile elevation pick-off, each of said last-named motors having an output shaft rotating an amount corresponding respectively to the azimuth and elevational angle of the missile, a missile azimuth potentiometer, a missile elevation potentiometer, each of said last-named potentiometers having a slider arm mechanically connected to the output shaft of the respective missile azimuth and missile elevation servo motors, a first twin diode comprising a first and a second diode, the cathode of the first diode of the first twin diode being electrically connected to the potentiometer slider arm of said target elevation potentiometer, the cathode of the first diode and the plate of the second diode of the first twin diode being connected together, the cathode of the second diode of the first twin diode being electrically connected to the slider arm of the missile elevation potentiometer, the plate of the first diode of the first twin diode being electrically connected to the cathode of the second diode of the first twin diode, a first relay connected to the plate of the second diode of the first twin diode, a second relay connected to the plate of the first diode of the first twin diode, each of said relays having a contact, a first and a second signal generator to respectively actuate the up and down channels of the means to control the missile, electron current flow occurring when a difference exists in potential corresponding to instantaneous angle of the missile and the target selectively at the slider arms to selectively actuate the first and second plate relays to thereby actuate selected channels of the command transmitter means on closure of the contacts of said first and second relays.

6. The apparatus of claim 5 including a second twin diode, said second twin diode comprising a third diode and a fourth diode, the plate of the third diode being electrically connected to the cathode of the fourth diode and to the slider arm of the target azimuth potentiometer, the cathode of the third diode being directly connected to the slider arm of the missile azimuth potentiometer and to the plate of the fourth diode, a plate relay in the plate circuit of said third diode, a plate relay in the plate circuit of said fourth diode, a difference in azimuth line of sight to the target and to the missile effecting current flow thereby energizing one of the third and fourth diode plate relays, a contact associated with each of said third and fourth plate relays, wave generator means to cause keying of said command transmitter to transmit left command signals to the missile upon closing of the contacts of said third diode plate relay, wave generator means to cause keying of the command transmitter to transmit right command signals to the missile upon closing of the contacts of said fourth diode plate relay, the resistance portions of said target elevation and azimuth potentiometers and said missile azimuth and elevation potentiometers being disposed in parallel, a voltage source disposed in parallel across each of said resistance portions, the resistance portions each being of characteristics to insure potential matching between the target and the missile azimuth potentiometer slider arms and between the target and missile elevation potentiometer slider arms when the line of sight in azimuth and the line of sight in elevation to the target and to the missile respectively coincide.

7. The apparatus of claim 6 including a cathode ray tube, means to alternately connect the horizontal plate of the cathode ray tube to the slider arm of the target azimuth potentiometer and the missile azimuth potentiometer, means to alternately connect the vertical plate of the cathode ray tube to the slider arm of the target elevation potentiometer and the missile elevation potentionmeter, said means to alternately connect the plates thereby effecting voltages corresponding to target elevation and azimuth and to missile azimuth and elevation so as to present a first indication on the cathode ray tube face corresponding to instantaneous target line of sight and a second indication corresponding to instantaneous missile line of sight thereby providing means to determine the difference between the line of sight to the target and the line of sight to the missile so that correction may be effected to cause the missile to deviate in a manner to cause the line of sights of the missile and of the target to coincide.

8. In an apparatus for defending an aircraft from an attacking target by means of an aerodynamically stable, spherically shaped, guided missile launched at the attacking target, and wherein said missile has incorporated therein means for effecting deviations in a path directed away from the aircraft; means to cause the missile to effect deviations in the missile path, means to determine the line of sight to the target from the aircraft, means to determine the line of sight to missile from the aircraft, said missile path deviations causing means comprising a command transmitter and means to actuate said transmitter to automatically effect up, down, left, and right commands to cause deviations in the line of sight to the missile from the aircraft, said target line of sight determining means comprising a radar device having an antenna with an axis aligned with the line of sight to the target, said missile line of sight determining means comprising an infrared tracker including an infrared receiving device having its axis in a direction corresponding to the line of sight to the missile, pick-off means associated with said radar antenna and with said infrared device to generate signals representing instantaneous line of sight to the target and to the missile, means responsive to said pick-off signals to compare said signals representing the instantaneous direction in azimuth and elevation of the target and the missile, and means responsive to said comparison means to operate said transmitter actuating means to produce up, down, left and right commands causing the line of sight to the missile to be aligned with the line of sight to the target.

References Cited by the Examiner

UNITED STATES PATENTS

| | | | |
|---|---|---|---|
| 2,517,702 | 8/50 | Offner | 244—14.3 |
| 2,557,949 | 6/51 | Deloraine | 244—14.5 |
| 2,703,399 | 3/55 | Williams et al. | 244—14.5 X |
| 2,745,095 | 5/56 | Stoddard | 244—14.5 X |
| 2,769,975 | 11/56 | Rines | 244—14 X |
| 2,801,815 | 8/57 | Williams | 244—14 |

SAMUEL FEINBERG, *Primary Examiner.*

ARTHUR GAUSS, NORMAN H. EVANS, *Examiners.*